United States Patent
Shah et al.

(10) Patent No.: US 9,569,790 B1
(45) Date of Patent: Feb. 14, 2017

(54) RESOURCE ALLOCATION FOR ADVERTISING CONTENT ON WIRELESS COMMUNICATION DEVICES

(75) Inventors: Maulik K. Shah, Overland Park, KS (US); Deveshkumar Narendrapratap Rai, Overland Park, KS (US); Jasinder Pal Singh, Olathe, KS (US); Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 226 days.

(21) Appl. No.: 13/367,123

(22) Filed: Feb. 6, 2012

(51) Int. Cl.
*G06Q 30/02* (2012.01)
*H04L 5/00* (2006.01)

(52) U.S. Cl.
CPC ......... *G06Q 30/0267* (2013.01); *H04L 5/0064* (2013.01)

(58) Field of Classification Search
CPC ............................ G06Q 30/0267; H04L 5/0064
See application file for complete search history.

(56) References Cited

U.S. PATENT DOCUMENTS

| | | | | |
|---|---|---|---|---|
| 8,368,711 B2* | 2/2013 | Zhao et al. | ................... | 345/581 |
| 8,498,628 B2* | 7/2013 | Shapiro et al. | ............ | 455/414.3 |
| 2007/0242700 A1 | 10/2007 | Moote et al. | | |
| 2008/0201225 A1* | 8/2008 | Maharajh et al. | ............... | 705/14 |
| 2009/0013356 A1 | 1/2009 | Doerr et al. | | |
| 2010/0023959 A1 | 1/2010 | Bugenhagen | | |
| 2010/0023987 A1 | 1/2010 | Bugenhagen | | |
| 2011/0202405 A1* | 8/2011 | Clark et al. | ................. | 705/14.49 |
| 2011/0296458 A1* | 12/2011 | Di Mattia et al. | ............... | 725/36 |
| 2012/0144288 A1* | 6/2012 | Caruso et al. | ................. | 715/234 |
| 2012/0331515 A1* | 12/2012 | Wiser et al. | ................... | 725/114 |
| 2013/0163953 A1* | 6/2013 | Peacock | ........................ | 386/231 |

OTHER PUBLICATIONS

Bandwidth is running out. Let's save the bandwidth; Sep. 15, 2011; Fabio Sonnati.*

* cited by examiner

*Primary Examiner* — Deirdre Hatcher (57) ABSTRACT

Systems, methods, and software for operating a wireless communication device are provided herein. In a first example, a method of operating a wireless communication device is provided. The method includes receiving user content and advertising content over a wireless link from a wireless communication network, and responsive to user input on the wireless communication device, altering a first resource portion associated with the wireless communication device for handling of the advertising content and altering a second resource portion associated with the wireless communication device for handling of the user content.

4 Claims, 4 Drawing Sheets

RESOURCE ALLOCATION FOR ADVERTISING CONTENT ON WIRELESS COMMUNICATION DEVICES

TECHNICAL FIELD

Aspects of the disclosure are related to the field of communications, and in particular, user data and advertising data transfer and handling in wireless communication networks by wireless communication devices.

TECHNICAL BACKGROUND

Wireless communication systems typically include wireless access systems, with equipment such as base stations, which provide wireless access to communication services for user devices over wireless links. A typical wireless communication system includes systems to provide wireless access across a geographic region, with wireless coverage areas associated with individual base stations. The wireless access systems exchange user communications and supplemental communications between wireless communication devices and service providers for the communication services.

Communication services typically include voice calls, data exchange, web pages, streaming media, or text messages, among other communication services. As a part of these communication services, content from advertising service providers can be handled through the wireless communication system for receipt by users of wireless communication devices. Many times, primary content, such as the data requested by a user, is accompanied by supplemental content, such as advertising content.

Overview

Systems, methods, and software for operating a wireless communication device are provided herein. In a first example, a method of operating a wireless communication device is provided. The method includes receiving user content and advertising content over a wireless link from a wireless communication network, and responsive to user input on the wireless communication device, altering a first resource portion associated with the wireless communication device for handling of the advertising content and altering a second resource portion associated with the wireless communication device for handling of the user content.

In another example, a wireless communication device is provided. The wireless communication device includes a transceiver configured to receive user content and advertising content over a wireless link from a wireless communication network. The wireless communication device also includes a processing system configured to, responsive to user input on the wireless communication device, alter a first resource portion associated with the wireless communication device for handling of the advertising content and alter a second resource portion associated with the wireless communication device for handling of the user content.

In another example, a computer-readable medium having program instructions stored thereon for operating a wireless communication device is provided. When executed by the wireless communication device, the program instructions direct the wireless communication device to receive user content and advertising content over a wireless link from a wireless communication network, and responsive to user input on the wireless communication device, alter a first resource portion associated with the wireless communication device for handling of the advertising content and alter a second resource portion associated with the wireless communication device for handling of the user content.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
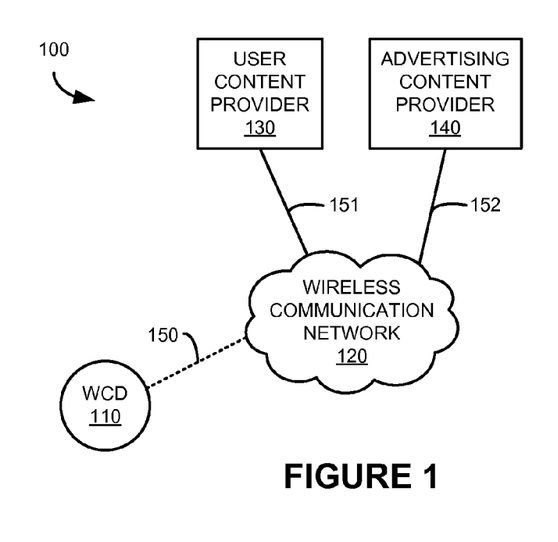
FIG. 1 is a system diagram illustrating a communication system.

FIG. 1 is a system diagram illustrating communication system 100. Communication system 100 includes wireless communication device (WCD) 110, wireless communication network 120, user content provider 130, and advertising content provider 140. WCD 110 and wireless communication network 120 communicate over wireless link 150. User content provider 130 and wireless communication network 120 communicate over link 151. Advertising content provider 140 and wireless communication network 120 communicate over link 152.

In operation, WCD 110 receives wireless access to communication services, such as voice calls, text messaging, or data access, through radio access equipment of wireless communication network 120. Among these communication services, WCD 110 can request and receive data content, such as web pages, streaming media, social networking content, or other information and data. Various advertising content may be provided with the requested user content, such as banner ads associated with web pages, streaming advertisements associated with streaming media, or interactive advertisements associated with social networking content, among other forms of advertising, including combinations thereof. The advertising content is typically transferred for delivery to WCD 110 by advertising content provider 140 while user requested content is typically transferred for delivery to WCD 110 by user content provider 130. It should be understood that although elements 130 and 140 are shown as separate elements in FIG. 1, these elements can be included in common systems and equipment.

Figure 2:
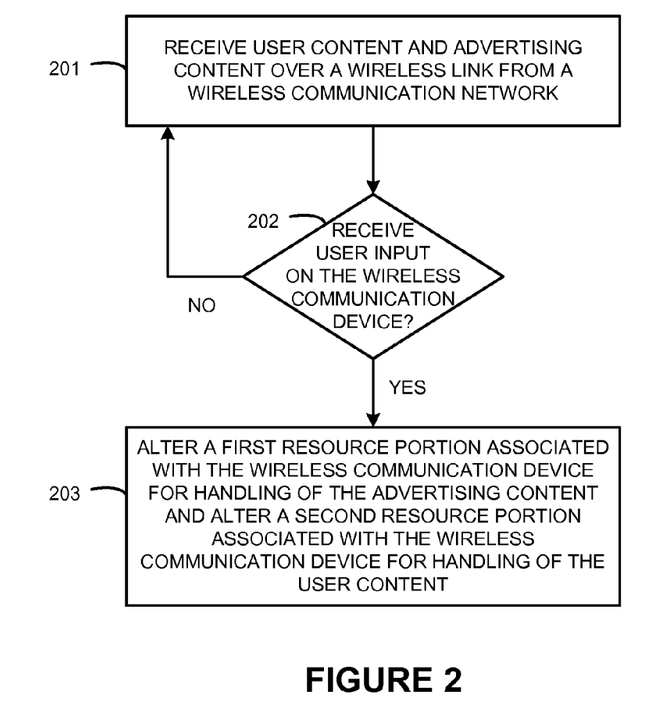
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless communication device 110 receives (201) user content and advertising content over wireless link 150 from wireless communication network 120. In this example, the user content typically includes content transferred to WCD 110 after being requested by a user of WCD 110 or related to the usage activities of WCD 110. Advertising content typically accompanies the user content being transferred to WCD 110, and the actual advertising content is typically selected by other systems, such as advertising content provider 140. Although FIG. 1 shows a single line for wireless link 150, wireless link 150 can include resource portion subdivisions such as streams, pathways, sessions, or other subdivisions, or can comprise multiple wireless links. In some examples, the user content and the advertising content are each transferred to WCD 110 over different resource portions of wireless link 150.

Responsive to user input on the wireless communication device (202), wireless communication device 110 alters (203) a first resource portion associated with wireless communication device 110 for handling of the advertising content and alters a second resource portion associated with wireless communication device 110 for handling of the user content. A first resource portion and a second resource portion associated with WCD 110 can have an initial configuration, and the user input then alters this initial configuration to a subsequent configuration. The user input can be a selection command, such as a touchscreen input selection, keypad input, among other user input methods. In some examples, choices of resource allocations are presented to a user of WCD 110 and the user selects from among the choices. The choices can be based on a monetary cost of the different resource allocations, or on a user preference on the allocations, among other choices.

The resource portions can include many different resource portions associated with WCD 110. For example, the resource portions may be a bandwidth of wireless link 150 dedicated to user content and a bandwidth of wireless link 150 dedicated to advertising content. In another example, the resource portion may be a display screen allotment, such as a number of pixels dedicated to user content and a number of pixels dedicated to advertising content. In yet another example, the resource portions may be processing system element utilization rates or percentages, with a first amount allocated for processing user content and a second amount allocated for processing advertising content. Other resource portion allocations associated with WCD 110 can be adjusted, and these resource portions are not limited to portions of a wireless link or the elements discussed above.

Figure 3:
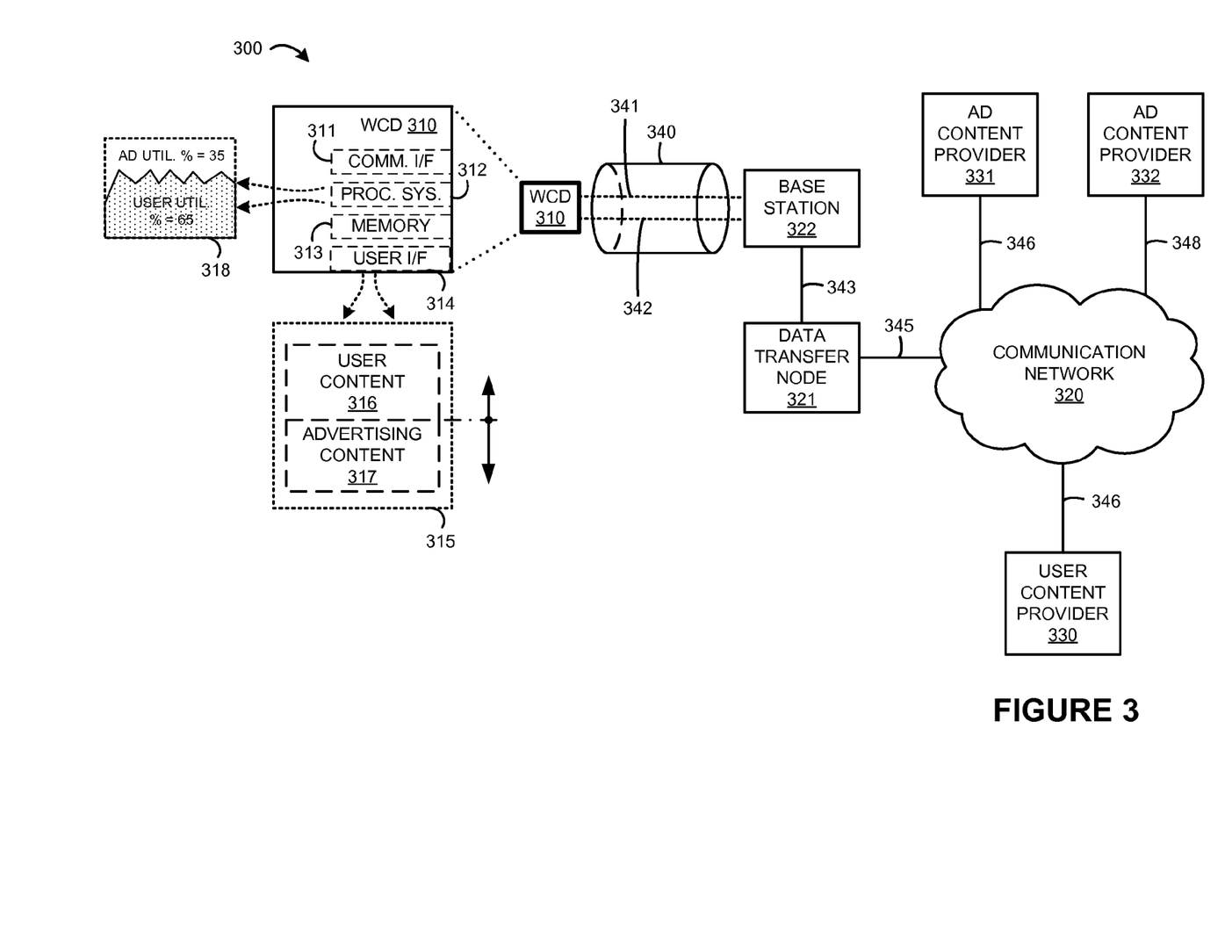
FIG. 3 is a system diagram illustrating a communication system.

FIG. 3 is a system diagram illustrating communication system 300. Communication system 300 includes wireless communication device (WCD) 310, communication network 320, data transfer node 321, base station 322, user content provider 330, and advertising content providers 331-332. WCD 310 and base station communicate over wireless link 340, which includes first resource portion 341 and second resource portion 342. Wireless link 340 is a cellular data link in this example, such as a CDMA, WiMAX, or LTE link, although other wireless link types can be employed. Base station 322 and data transfer node 321 communicate over link 343. Data transfer node 321 and communication network 320 communicate over link 345. User content provider 330 and communication network 320 communicate over link 346. Ad content provider 331 and communication network 320 communicate over link 347. Ad content provider 332 and communication network 320 communicate over link 348. Each of links 343-348 are data links capable of carrying Internet protocol (IP) packet communications, such as networking links, optical links, Ethernet links, or other packet network links, and can include intermediate equipment such as routers.

A detailed view of WCD 310 is illustrated in FIG. 3. WCD 310 includes communication interface 311, processing system 312, memory 313, and user interface 314. In operation, processing system 312 is operatively linked to communication interface 311, memory 313, and user interface 314. Processing system 312 is capable of executing software stored in memory 313. When executing the software, processing system 312 drives WCD 310 to operate as described herein.

Processing system 312 may be implemented within a single processing device but may also be distributed across multiple processing devices or sub-systems that cooperate in executing program instructions. Examples of processing system 312 include general purpose central processing units, microprocessors, application specific processors, and logic devices, as well as any other type of processing device.

Communication interface 311 may include communication connections and equipment that allows for communication with wireless access nodes of a wireless communication system. Examples include antennas, power amplifiers, RF circuitry, transceivers, and other communication circuitry.

Memory 313 may comprise any storage media readable by processing system 312 and capable of storing software. Memory 313 may include volatile and nonvolatile, removable and non-removable media implemented in any method or technology for storage of information, such as computer readable instructions, data structures, program modules, or other data. Memory 313 may be implemented as a single storage device but may also be implemented across multiple storage devices or sub-systems. Memory 313 may comprise additional elements, such as a controller, capable of communicating with processing system 312. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 313 may comprise computer program instructions, firmware, or some other form of machine-readable processing instructions having processes that when executed by processing system 312 direct WCD 310 to operate as described herein. For example, software drives WCD 310 to receive user content and advertising content, receive user input to allocate resource portions associated with WCD 310, and alter the resource portions according to the user input, among other operations. The software may also include user software applications. The software may be implemented as a single application or as multiple applications. In general, the software may, when loaded into processing system 312 and executed, transform processing system 312 from a general-purpose device into a special-purpose device customized as described herein.

User interface 314 may have input devices such as a keyboard, a mouse, a voice input device, or a touch input device, and comparable input devices. Output devices such as a display, speakers, printer, and other types of output devices may also be included with user interface 314. For example, in FIG. 3, user interface 314 includes display 315 for displaying user content 316 and advertising content 317 to a user of WCD 310. User interface 314 may also be considered to be an integration of WCD 310 with software elements, such as operating system and application software. For instance, a user may navigate an application view using a user device, such as a touchpad, or place a voice call using a keypad. The interface functionality provided by the integration of user interface software with user interface devices can be understood to be part of user interface 314.

Communication network 320 is a core network of a cellular communications network in this example. Communication network 320 can include elements such as those discussed above for communication network 120, among other configurations. As a part of communication network 320, data transfer node 321 and base station 322 are illustrated separately to emphasize the operation of communication network 320. In this example, base station 322 includes wireless transceiver equipment, antennas, and base transceiver station equipment for providing wireless access for WCD 310 and other wireless communication devices. Data transfer node 321 includes data routing and processing equipment for receiving user content transferred by user content provider 330 and advertising content transferred by ad content providers 331-332. Data transfer node 321 can apportion the user content and advertising content into different resource portions, such as streams or quality-of-service streams for transfer to WCD 310. In some examples, data transfer node 321 comprises a packet data serving node (PDSN) of communication network 320, although other configurations can be employed. Data transfer node 321 can determine network parameters associated with ones of user content provider 330 and ad content providers 331-332, such as IP addresses associated with the various equipment, systems, or data traffic.

User content provider 330 and ad content providers 331-332 can each comprise systems and equipment for receiving content requests transferred by user devices, such as wireless communication devices, and providing content responsive to the content requests for delivery to user devices, among other operations. User content provider 330 and ad content providers 331-332 can each also include communication or network interfaces, as well as computer systems, microprocessors, circuitry, or some other processing devices or software systems, and may be distributed among multiple processing devices. Examples of user content provider 330 and ad content providers 331-332 may each include software such as an operating system, logs, databases, utilities, drivers, networking software, and other software stored on a computer-readable medium. User content provider 330 and ad content providers 331-332 can each include application servers, application service provider systems, cloud-based systems, database systems, web servers, streaming media servers, authentication systems, or other systems. In some examples, ad content providers 331-332 each have static or fixed IP addresses associated therewith.

Figure 4:
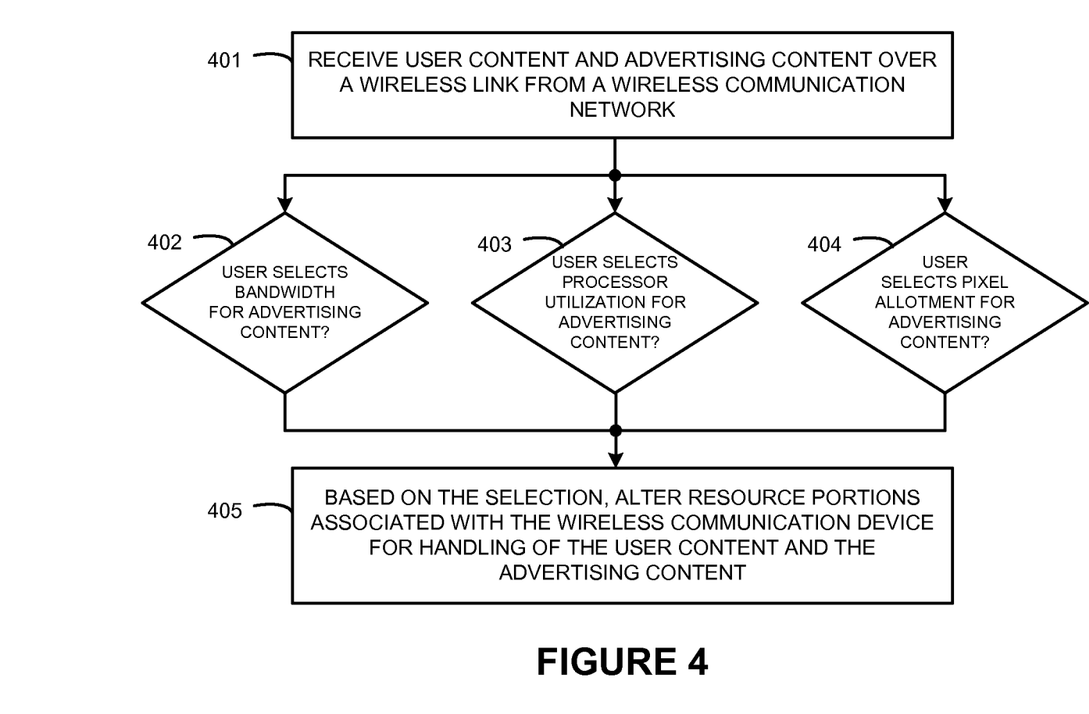
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, WCD 310 receives (401) user content and advertising content over wireless link 340 from wireless communication network 320. As shown in FIG. 3, user content is provided by user content provider 330 and advertising content is provided by ones of ad content providers 331-332. The user content and advertising content is transferred for delivery to WCD 310 over communication network 320 by way of data transfer node 321 and base station 322. Resource portions associated with WCD 310 can be in initial configurations. For example, a bandwidth for each of resource portions 341-342 of wireless link 340 can be at an initial bandwidth configuration, resource portions of processing system 312 can be at an initial processor utilization configuration, and resource portions of display 315 can be at an initial pixel allotment configuration.

A user of WCD 310 can then make a selection or enact a user command or instruction which alters the various resource portions of WCD 310. FIG. 4 discusses three resource portion alteration types, namely a bandwidth (402) of wireless link 340, a processor utilization (403) of processing system 312, and a pixel allotment (404) for display 315. It should be understood that further or different resource portions associated with WCD 310 can be altered. These alterations of the resource portions can be made in combination or separately. Based on the selections in operations 402-404, WCD 310 alters (405) these resource portions associated with WCD 310 for handling of advertising content and user content. Some various selections that a user of WCD 310 can make and the responsive alterations made by WCD 310 are discussed below.

In a first resource portion example (402), elements of communication network 320 handle the transfer of content over wireless link 340 to WCD 310. These elements, namely data transfer node 321 and base station 322, are detailed in FIG. 3 to emphasize their operation. For example, data transfer node 321 receives data intended for delivery to WCD 310 and processes and/or formats the data for subsequent transfer over radio network elements, namely base station 322. Base station 322 operates a wireless transceiver and antenna system which wirelessly exchanges data with WCD 310 or other wireless devices over wireless links. Data transfer node 321 can detect different content types, such as user content and advertising content, and also can modify or alter delivery parameters for ensuring transfer of the content to WCD 310. In some examples, each of ad content providers 331-332 may have static IP addresses associated therewith, and data transfer node 321 can perform content separation and handling based on these static IP addresses. Data transfer node 321 can determine these IP addresses associated with content providers, such as ad content providers 331-332, and separate the ad content into a data stream separate from user content data stream. In other examples, data transfer node 321 can examine data packets to separate the content into streams from among advertising and user content, such as using deep packet inspection. These streams can have quality-of-service parameters adjusted or modified independently of each other, and thus the ad content and user content can be each transferred for delivery to WCD 310 in separate quality-of-service streams. These separate streams are represented in FIG. 3 by resource portions of wireless link 340. Specifically, a user content stream is represented by resource portion 341, and an ad content stream is represented by resource portion 342. Although separate streams may also be employed over link 343, this link is shown as a single link in FIG. 3 for clarity.

In response to a user command or selection received by WCD 310 to alter a bandwidth resource portion of wireless link 340, WCD 310 can generate and transfer a resource allotment message for delivery to equipment of communication network 320, such as data transfer node 321. This resource allotment message can indicate a user selection for bandwidths desired to be allotted for user content and for advertising content. Responsive to this resource allotment message, data transfer node 321 or other elements of communication network 320 can alter bandwidth allotments for ones of user content and advertising content. In some examples, a quality of service is associated with each resource portion of wireless link 340, and a first resource portion for user content is altered based on a first quality of service, and a second resource portion for advertising content is altered based on a second quality of service. A single quality of service metric can also be employed, where the resource portions divide up the single quality of service metric among the user content and the advertising content. In another example, receiving the user content and the advertising content over wireless link 340 includes receiving the user content at a first data transfer rate in a first quality of service stream over the wireless link and receiving the advertising content at a second data transfer rate in a second quality of service stream.

In a second resource portion example (403), elements of WCD 310 handle processing of user content and advertising content, such as processor elements of processing system 312. These processor elements can have an associated utilization rate associated with processing each of user content and advertising content. These utilization rates are initially shown to be subsets of a total utilization rate, such as subsets of a 100% processor utilization as shown in a time-based utilization graph 318. Utilization graph 318 shows example average processor utilization for advertising content at 35% and user content at 65%. It should be understood that other utilization metrics and amounts can exist, and the total content processor utilization can be shared with other processes and thus encompass less than 100% of the total processor utilization. WCD 310 can alter a resource portion of processing system 312 in response to a user instruction or user command received by WCD 310. This user instruction can indicate a user selection for processor utilizations desired to be allotted for user content and for advertising content. In some examples, a quality of service is associated with resource portions of processing system 312, and a first resource portion for user content is altered based on a first quality of service, and a second resource portion for advertising content is altered based on a second quality of service.

In a third resource portion example (404), elements of user interface 314 of WCD 310 handle graphical display of user content and advertising content, such as shown for display 315 in FIG. 3. Display 315 has a total number of pixels usable for display of content to a user, and this total number of pixels can be allotted among user content 316 and advertising content 317. Thus, a first number of pixels is used for displaying user content 316 and a second number of pixels is used for displaying advertising content 317. For example, a first display portion can be used to display a video to a user, while a second display portion can be used to display an advertisement to a user during playback of the video. It should be understood that portions of display 315 can be employed for other content than user content 316 and advertising content 317, such as operating system content, user controls, alert messages, or other content. WCD 310 can alter a resource portion of display 315, or other elements of user interface 314, in response to a user instruction or user command received by WCD 310. This user instruction can indicate a user selection for pixel allotments or screen portions desired to be allotted for user content and for advertising content. In some examples, a quality of service is associated with resource portions of display 315, and a first resource portion for user content is altered based on a first quality of service, and a second resource portion for advertising content is altered based on a second quality of service.

Figure 5:
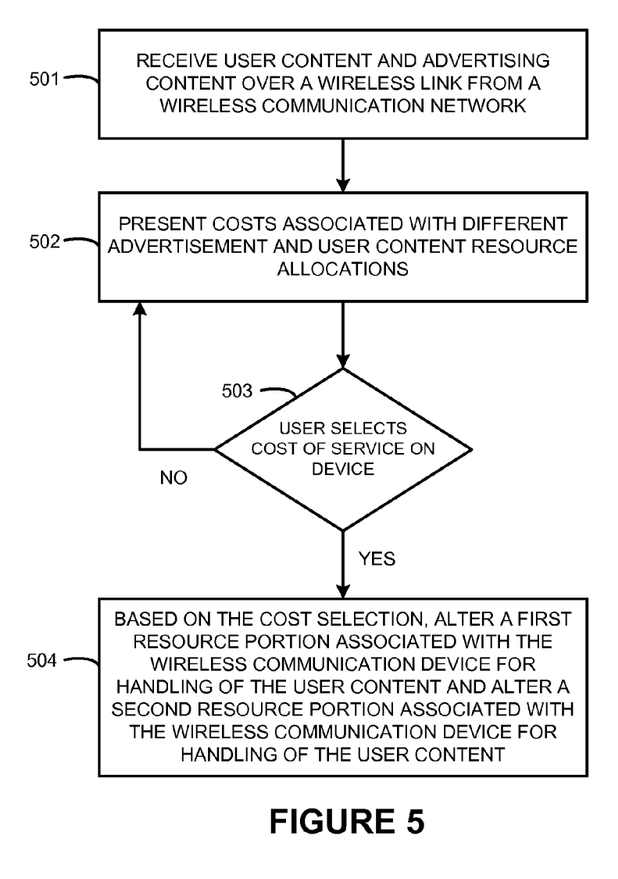
FIG. 5 is a flow diagram illustrating a method of operation of a communication system.

FIG. 5 is a flow diagram illustrating a method of operation of communication system 300. The operations of FIG. 5 are referenced herein parenthetically. FIG. 5 can represent a further example of the selections and alterations made in FIG. 4, among other selections and alterations. For instance, the selections/alterations discussed in FIG. 4 can each have monetary costs associated therewith and a user of WCD 310 can be presented with monetary options for altering the various resource portions associated with WCD 310.

As in FIG. 4, WCD 310 receives (501) user content and advertising content over wireless link 340 from wireless communication network 320. As shown in FIG. 3, user content is provided by user content provider 330 and advertising content is provided by ones of ad content providers 331-332. The user content and advertising content is transferred for delivery to WCD 310 over communication network 320 by way of data transfer node 321 and base station 322. Resource portions associated with WCD 310 can be in initial configurations. For example, a bandwidth for each of resource portions 341-342 of wireless link 340 can be at an initial bandwidth configuration, resource portions of processing system 312 can be at an initial processor utilization configuration, and resource portions of display 315 can be at an initial pixel allotment configuration.

WCD 310 can present (502) costs associated with different advertisement content and user content resource allocations. WCD 310 can indicate these costs in graphical user elements, such as on display 315, and a user of WCD 310 can select from among these costs. The costs can be each associated with the various resource portions and elements discussed herein, such as a first high cost presented for a high bandwidth of wireless link 340 allocated to user content and a low bandwidth of wireless link 340 allocated to advertising content. A second low cost can be presented for a low bandwidth of wireless link 340 allocated to user content and a high bandwidth of wireless link 340 allocated to advertising content. This change in cost can correspond to an increased resource allotment for advertising content, and thus increasing resource allotments for advertising content can subsidize operating costs of WCD 310 for a user. Other resource portions associated with WCD 310 can have similar cost configurations presented to a user of WCD 310. In other examples, a first global choice can be presented to a user for a first high monetary cost, and user content is prioritized across all resource portions while advertising content receives a reduced portion of the resource portions. Likewise, a second global choice can be presented to a user for a second low monetary cost, and user content receives a reduced portion of the resource portions while advertising content is prioritized across all resource portions of WCD 310.

The user of WCD 310 selects (503) the cost of service on WCD 310. Based on the cost selection, WCD 310 alters first resource portion or portions associated with WCD 310 for handling of user content and alters second resource portion or portions associated with WCD 310 for handling of advertising content. The discussion above for FIG. 4 reveals further details on the selection and alteration process for resource portions associated with WCD 310.

Referring back to FIG. 1, wireless communication device 110 comprises transceiver circuitry and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. Wireless communication device 110 can include multiple transceiver portions or antenna portions, among other circuit and equipment elements, for communicating wirelessly with multiple wireless communication networks, using different wireless communication modes or wireless communication protocols.

Wireless communication network 120 comprises communication and control systems for providing access to communication services for user devices, such as wireless communication device 110. In some examples, wireless communication network 120 includes equipment to provide wireless access to communication services within different coverage areas to user devices, route communications between content providers and user devices, and receive and process registration and content requests, among other operations. Wireless communication network 120 may also comprise wireless access nodes, wireless access node controllers, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), data transfer nodes, packet data switching nodes (PDSN), home agents (HA), mobility access gateways (MAG), Internet access nodes, telephony service nodes, wireless data access points, routers, databases, or other communication and control equipment.

User content provider 130 comprises systems and equipment for receiving content requests transferred by user devices, such as wireless communication devices, and providing primary content responsive to the content requests for delivery to user devices, among other operations. User content provider 130 also includes communication or network interfaces, as well as computer systems, microprocessors, circuitry, or some other processing devices or software systems, and may be distributed among multiple processing devices. Examples of user content provider 130 may also include software such as an operating system, logs, databases, utilities, drivers, networking software, and other software stored on a computer-readable medium. User content provider 130 can also include application servers, application service provider systems, cloud-based systems, database systems, web servers, streaming media servers, authentication systems, or other systems.

Advertising content provider 140 comprises systems and equipment for transferring advertising and supplemental content for delivery to user devices, such as wireless communication devices. The advertising content can be transferred in response to a user content request from user content provider 130. Advertising content provider 140 can include communication and network interfaces, as well as computer systems, microprocessors, circuitry, or some other processing devices or software systems, and may be distributed among multiple processing devices. Examples of advertising content provider 140 may also each include software such as an operating system, logs, databases, utilities, drivers, networking software, and other software stored on a computer-readable medium. Advertising content provider 140 can also each include application servers, application service provider systems, cloud-based systems, database systems, web servers, streaming media servers, authentication systems, or other systems.

Communication links 151-152 each use metal, glass, optical, air, space, or some other material as the transport media. Communication links 151-152 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 151-152 can each be a direct link or may include intermediate networks, systems, or devices, and can include a logical network link transported over multiple physical links.

Wireless link 150 uses the air or space as the transport media. Wireless link 150 may use various protocols, such as Code Division Multiple Access (CDMA), Evolution-Data Optimized (EVDO), single-carrier radio transmission technology link (1×RTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although one main wireless link 150 is shown in FIG. 1, it should be understood that wireless link 150 is merely illustrative to show communication modes or wireless access pathways for wireless communication device 110. In other examples, further wireless links can be shown, with portions of the further wireless links shared and used for different communication sessions or different content types, among other configurations.

Communication links 150-152 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device comprising:
   displaying a user prompt for resource allotment among advertising content and user content, wherein the user prompt indicates a plurality of allocation quality of service (QoS) options and associated monetary costs for each of the plurality of allocation QoS options;
   receiving user input indicating an allocation QoS from the plurality of allocation QoS options;
   in response to the user input, determining an advertising content resource allotment and a user content resource allotment based on the user input, wherein the advertising content resource allotment comprises an advertising bandwidth resource allotment for the advertising content and an advertising processing system utilization allotment for the advertising content, and wherein the user content resource allotment comprises a user content bandwidth resource allotment for the user content and a user content processing system utilization allotment for the user content;

transferring a resource allotment message to a wireless communication network indicating the advertising bandwidth resource allotment and the user content bandwidth resource allotment;

wirelessly receiving the user content from the wireless communication network in accordance with the advertising bandwidth resource allotment and the user content bandwidth resource allotment;

processing the advertising content from the wireless communication network using the advertising processing system utilization allotment and the user content from the wireless communication network using the user content processing system utilization allotment; and displaying the user content and the advertising content.

2. The method of claim 1 wherein the advertising content resource allotment further comprises an advertising content pixel allotment and wherein the user content resource allotment further comprises a user content pixel allotment, and wherein displaying the user content and the advertising content comprises displaying the user content using the user content pixel allotment and the advertising content using the advertising content pixel allotment.

3. A wireless communication device comprising:

a user interface configured to display a user prompt for resource allotment among advertising content and user content, wherein the user prompt indicates a plurality of allocation quality of service (QoS) options and associated monetary costs for each of the plurality of allocation QoS options, and receive user input indicating an allocation QoS from the plurality of allocation QoS options;

a processing system, in response to the user input, configured to determine an advertising content resource allotment and a user content resource allotment based on the user input, wherein the advertising content resource allotment comprises an advertising bandwidth resource allotment for the advertising content and an advertising processing system utilization allotment for the advertising content, and wherein the user content resource allotment comprises a user content bandwidth resource allotment for the user content and a user content processing system utilization allotment for the user content, and transfer a resource allotment message to a wireless communication network indicating the advertising bandwidth resource allotment and the user content bandwidth resource allotment;

a transceiver configured to wirelessly receive the user content from the wireless communication network in accordance with the advertising bandwidth resource allotment and the user content bandwidth resource allotment;

the processing system configured to process the advertising content from with wireless communication network using the advertising processing system utilization allotment and the user content from the wireless communication network using the user content processing system utilization allotment; and the user interface configured to display the user content and the advertising content.

4. The wireless communication device of claim 3 wherein the advertising content resource allotment further comprises an advertising content pixel allotment and wherein the user content resource allotment further comprises a user content pixel allotment, and wherein the user interface configured to display the user content and the advertising content is configured to display the user content using the user content pixel allotment and the advertising content using the advertising content pixel allotment.

* * * * *